United States Patent Office 3,467,595
Patented Sept. 16, 1969

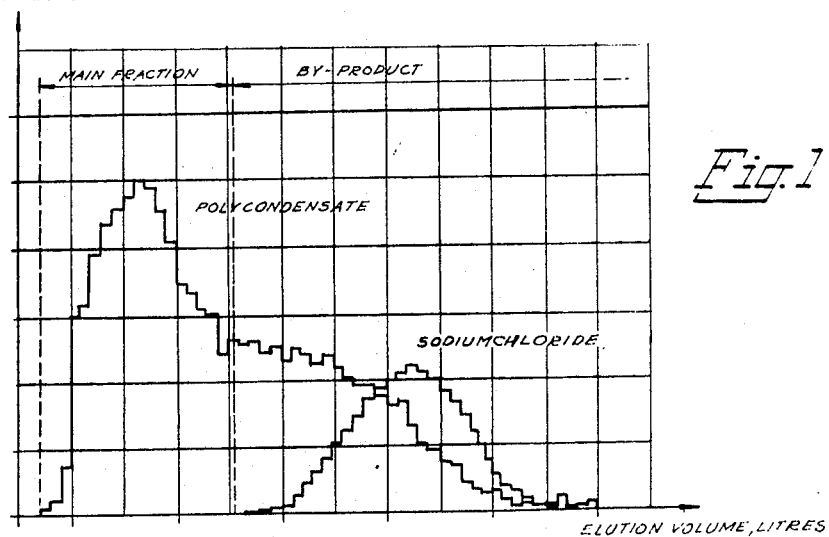
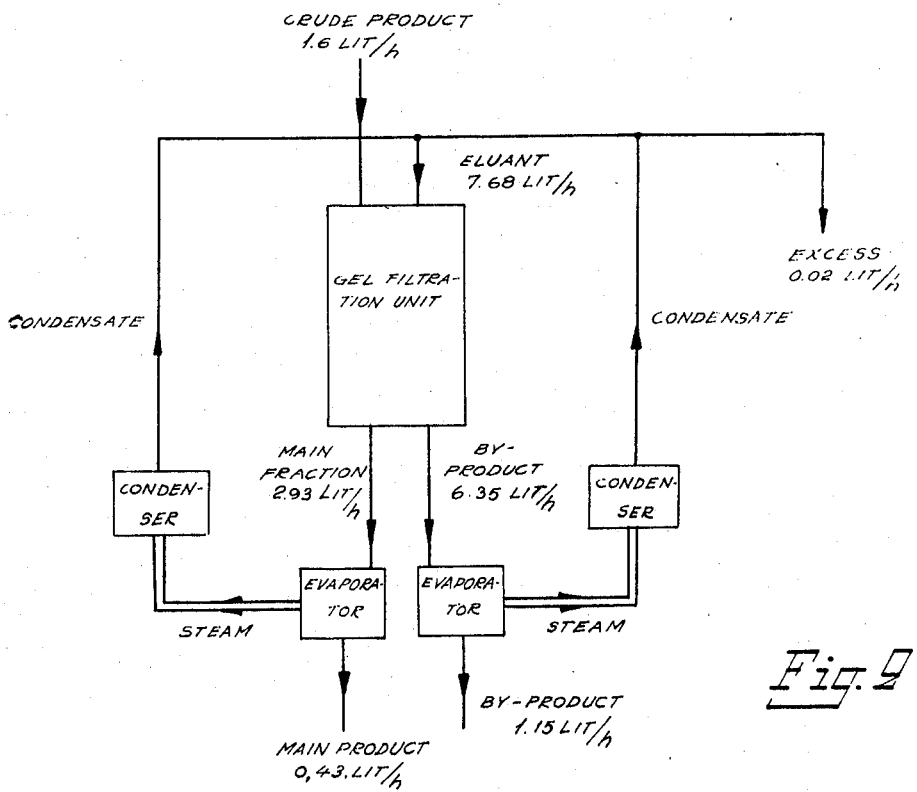

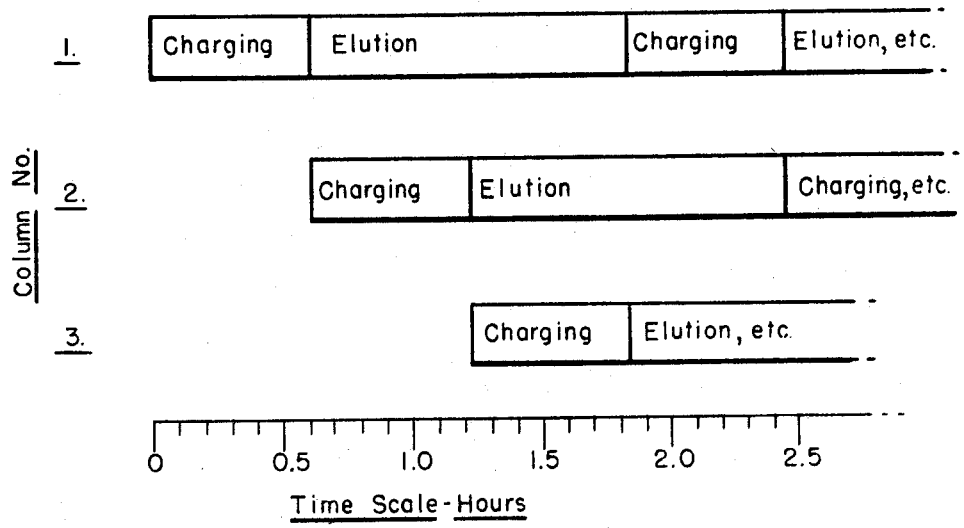

3,467,595
METHOD FOR THE SEPARATION OF SUBSTANCES OF DIFFERENT MOLECULAR SIZES FROM A SOLUTION OF SAID SUBSTANCES IN A SOLVENT
Arne O. Sten, Bergsbrunna, Sweden, assignor to Pharmacia Fine Chemicals AB, Uppsala, Sweden, a company of Sweden
Filed June 20, 1967, Ser. No. 647,520
Claims priority, application Sweden, June 22, 1966, 8,589/66
Int. Cl. B01d 15/06, 15/00
U.S. Cl. 210—26                                    3 Claims

ABSTRACT OF THE DISCLOSURE

Substances of different molecular sizes in a solution are separated by passing the solution in a bed of gel grains swollen in the solvent. The different substances are separately removed and collected by eluting with a solvent. The solvent is separated from the recovered fractions by vaporization, condensed, and reused.

---

The present invention relates to a method for the separation of substances of different molecular sizes from a solution of said substances in a solvent, the solution being introduced into one or more beds of gel grains swollen in said solvent and having such a structure that the substances, depending on their molecular sizes, are distributed differently between the gel grains and the surrounding solution, whereupon solvent is introduced into the bed or beds for the purpose of causing elution to take place while recovering at least one fraction containing one or more substances having relatively large molecular sizes and at least one fraction containing one or more substances having relatively small molecular sizes.

This technique is previously known (see i.e. the Swedish patent specification No. 185,246) and is usually called gel filtration. Hitherto, this process has been substantially used in the laboratory and, to a minor extent, on a semi-large scale for separating biochemical substances from one another and/or from accompanying low molecular weight substances such as salts and sugars.

No application of the gel filtration method on a full scale has been undertaken hitherto. The present invention is intended to enable an industrial utilization of the gel filtration method.

A technical disadvantage with this method is that it requires large quantities of solvent for elutions; which hitherto had to be supplied to the plant from without.

In the case of production within the pharmaceutical and food-stuffs industries it is usually stipulated that solutions undergoing treatment and intended for treatment shall be kept free from microorganisms and foreign substances. Further, it is naturally a general desire within a gel filtration plant to maintain the separation medium as free as possible from foreign substances.

In the case of gel filtration processes which are conducted while using organic solvents, it is generally desired to avoid fire risks and the physiological disadvantages which can arise through inhaling the solvent vapours.

It has now been found that the aforesaid disadvantages can be removed or substantially reduced and the stated desiderata fulfilled in an advantageous manner if one or more of the fractions recovered in the elution and/or the solution introduced into the gel filtration plant are subjected to evaporation and the thus vapourized solvent, subsequent to condensation, passed to the gel bed as eluting agent.

Pursuant to one advantageous embodiment of the invention the evaporation is caused to proceed to an extent that the formed condensate is completely sufficient to cover the necessary requirements for the elution operation. In this way a process is provided which can be conducted without special apparatus units, e.g. apparatus for distillation of eluant or for removal of microorganisms and pyrogenes or other non-desirable foreign substances in the system.

According to one important embodiment of the invention the separation process and the evaporation process can be conducted in a closed system. In this way a very essential advantage is obtained in that the liquids to be introduced into the bed or beds can be maintained free, not only from microorganisms and pyrogenes but also from dissolved gases, primarily air which otherwise would be liable, on small changes in pressure and temperature, to give rise to bubbles in the bed, with the consequent impairing of the flow conditions in the gel bed, whereby the effective result of the separation process is placed in jeopardy.

Used as a base material for the gel grains from which the separating bed or beds are composed is a copolymer of dextran with bifunctional substances, the said copolymer being sold under the trade name "Sephadex," and derivatives of such copolymers e.g. for use in organic solvents, or copolymers of alkylidene-bis-acrylamide with ethylenically unsaturated compounds, e.g. acrylamide. Gel grains formed of agar or agaros may also be used.

The invention will now be more closely described in the following by way of examples presented in conjunction with the accompanying drawings.

FIG. 1 is an elution curve for one cycle, in a column in the method described in Example 1.

FIG. 2 is a simplified flow sheet for the working method according to Example 1.

FIG. 5 shows the programming of feed and elution on three columns.

Example 1

Figure 3:
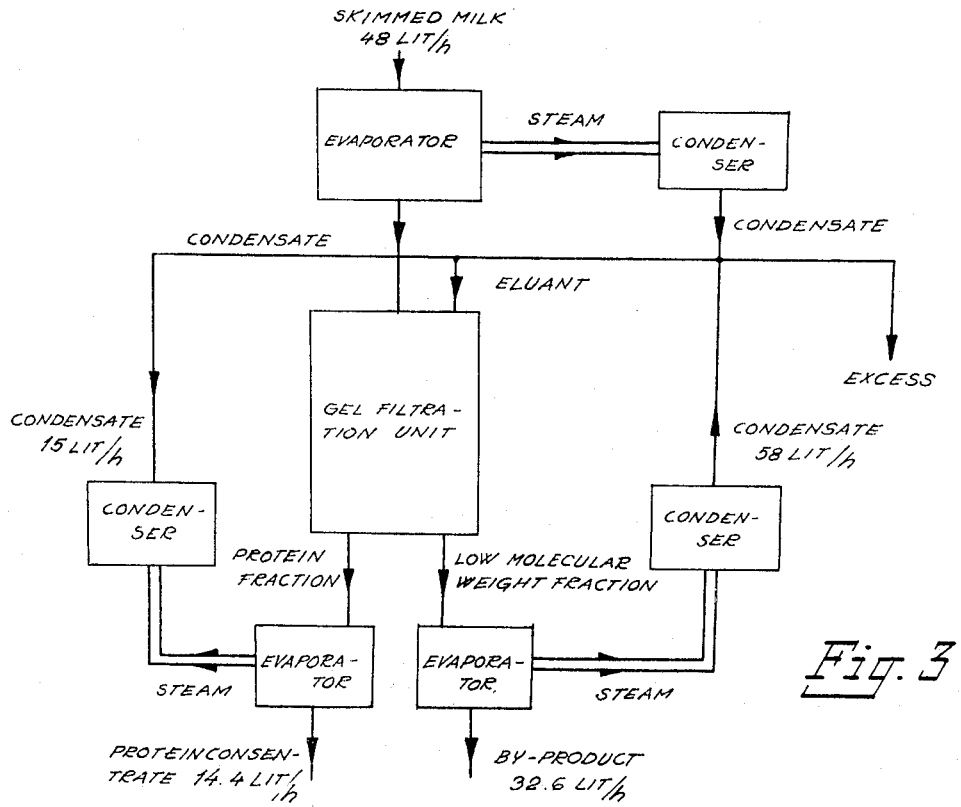
FIG. 3 is a flow sheet for the working method according to Example 2.
Figure 4:
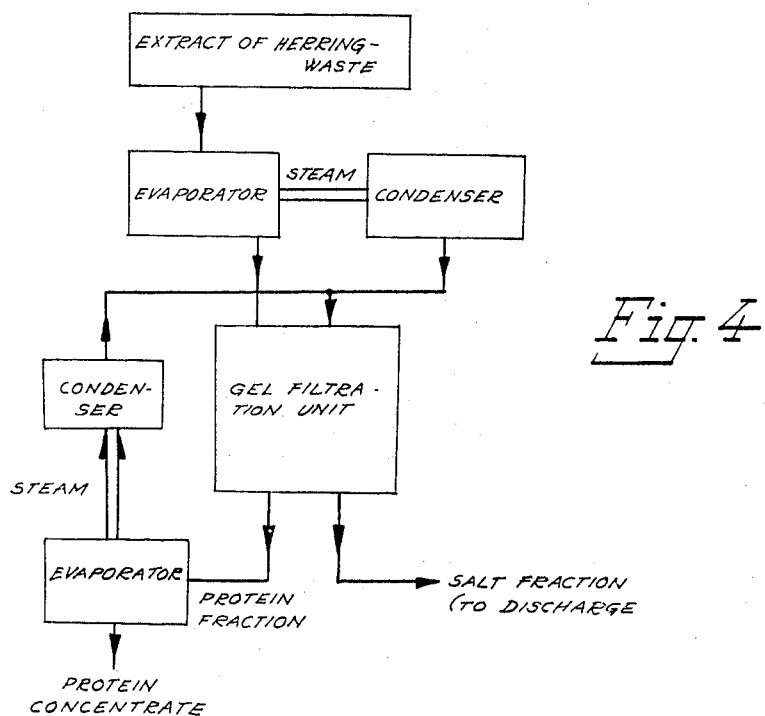
FIG. 4 is a flow sheet for the working method of Example 3.

The purpose of the present test was to work up a synthetic polymerization product, namely, a polycondensate of sucrose and epichlorohydrin. At the end of the polymerization the product existed in an aqueous solution. The problem was to purify the polymer from sodium chloride, unreacted monomers and condensates having too low a molecular weight. The problem was solved by means of gel filtration according to the following.

Gel grains of a copolymer of dextran with epichlorohydrin, having a water regain of 5.0 gram per gram of dry substance (Sephadex G–50 from AB Pharmacia, Uppsala), were swollen in water and packed in three gel filtration columns having a cross sectional area of 0.80 dm.$^2$. The volume of the bed in each column was 5.05 l. For each feed the volume was 1000 ml. of an aqueous solution containing 5% of crude polycondensate and 1.5% of sodium chloride. Elution was conducted with distilled water, 4.8 l. per cycle. The feed rate was 0.33 cm./min., i.e. 1.6 l./hour and the elution rate 0.80 cm./min., i.e. 3.84 l./hour. The programming of feed and elution on the three columns can be seen from FIGURE 5.

The feed and elution steps are thus continuous. The feed takes place at each moment on one of the columns at a rate of 1.6 l./hour. Elution occurs at each moment on two of the columns at a total rate of 7.68 l./hour. The total amount of liquid introduced into the plant was thus 9.28 l./hour. The elution curve for one cycle on a column can be seen from the following drawings, FIG. 1.

A main fraction of 1.83 l. containing the required polymer purified from sodium chloride, low molecular weight products and unreacted monomers was removed from each cycle. The remainder, 3.97 l., was the by-product. The main fraction removed was thus 31.5% of the supply, i.e. 2.93 l./hour, and the by-product 68.5%, i.e. 6.36 l./hour. The yield of polymer was 60%, i.e. the plant produced 48 grams of pure polymer per hour. The percentage of sodium chloride calculated on the polymer was 0.11%, which implied an effective purification. This percentage of sodium chloride of the crude product calculated on the dry substance percentage was 23%.

The need for eluant in the above described gel filtration process, 7.68 l./hour, was covered by evaporating the main fraction and by-product in individual thin layer-evaporators. 2.5 l./hour were driven off from the main fraction, the percentage of polymer rising from 1.6% to 11%. 5.2 l./hour were driven off from the by-product. Thus, a total of 7.7 l./hour were driven off. A minor excess of 0.02 l./hour, which was driven off to avoid the risk of a momentary deficiency in eluant was allowed to run over a spill way.

Since the removal of the main fraction and by-product was not completely continuous (delays occurred periodically in removing the main fraction and by-product from all three columns) an equalizing vessel was connected for the two flows between the gel filtration unit and the evaporators.

The complete process is found diagrammatically illustrated in FIG. 2.

Example 2

The purpose of the following process, which is diagrammatically presented in FIG. 3, was to recover a protein concentrate from skimmed milk which was substantially free from low molecular weight substances such as salts and lactose.

The starting material used was milk, from which practically all fat had been removed by separation. It contained 3.2% of proteins and 6.3% of low molecular weight substances such as salts and lactose.

The first stage in the process was to pass the skimmed milk through a thin layer-evaporator from which was obtained firstly a concentrated skimmed milk and secondly driven-off steam, which was condensed and the resulting condensate used for the subsequent gel filtration process. The supply of skimmed milk was 48 l./hour, the discharge of concentrate 24 l./hour and of condensate 24 l./hour. Thus, subsequent to the process of concentration the percentages of protein and low molecular weight substances were doubled. The second stage in the process was effected by a gel filtration unit consisting of three gel filtration columns with inner diameters of 20 cms. and a volume of 16 l. They were filled with gel grains of a copolymer of dextran with epichlorohydrin having a water regain of 2.5 grams per gram of dry substance (Sephadex G–25 coarse from AB Pharmacia, Uppsala), swollen in distilled water. In a manner similar to that described in Example 1, a continuous feed of the concentrated skimmed milk was arranged; i.e. at a rate of 24 l./hour. 4 l. were charge per cycle, for a period of 10 minutes. Similarly, continuous elution was conducted with distilled water at a rate of 48 l./hour on each column. Since two columns were always eluted simultaneously the total requirement of eluant was 96 l./hour. Each cycle required 16 l. of eluant for 20 minutes. The cycle period was thus 30 minutes.

Taken out from each cycle was 4.9 l. of protein fraction and 15.1 l. of a low molecular weight fraction. Thus, the plant produced 29.4 l./hour of a protein fraction and 90.6 l./hour of a low molecular weight fraction. The composition of the protein fraction was 5.0% of protein and 1.3% of low molecular weight substances. The ratio between low molecular weight substances and protein had thus been lowered from 2.0 to 0.26. The loss in protein, 5%, was regained in the low molecular weight fraction.

In the third stage of the process the protein fraction was evaporated and the low molecular weight fraction in each thin layer-evaporator and the driven-off steam was condensed and used together with the 24 l./hour which was driven off in the first stage as the eluting agent in the gel filtration stage. 15 l./hour of water was driven off from the protein fraction. So as to provide a sufficient margin for the need for eluting agent 96 l./hour, 58 l./hour was driven off from the low molecular weight fraction.

The desired product was thus 14.4 l./hour of a protein concentrate containing 10.2% of protein and 2.65% of low molecular weight substances. The concentrate of low molecular weight substances amounting to 32.6 l./hour was the secondary product.

In that the dischargings of the protein and low molecular weight fractions was not completely continuous a small buffer vessel was connected between the gel filtration unit and the subsequent evaporators.

Example 3

The purpose of this test was to recover substantially salt-free proteins from herring waste.

The waste obtained upon extraction of oil from herrings was treated with distilled water while strong agitating in a homogenisator. Subsequent to filtration, a solution containing fish proteins was obtained, impurified by salts and other low molecular weight substances. The solution was evaporated whereby a concentrate and steam was obtained which was condensed. The concentrate was divided by means of gel filtration into a protein fraction and a fraction containing salts and other low molecular weight substances. In this way the substances causing unpleasant odours and taste could be removed from the proteins, since these were obtained in the salt fraction. The protein fraction was subjected to evaporation; a protein concentrate and steam being obtained, the steam being condensed. The need of an eluting agent was covered by the condensate from the two mentioned evaporating processes. By spray drying the protein concentrate, a practically pure protein powder was produced.

I claim:

1. In a process for the separation of substances of different molecular sizes from a solution of these substances in a solvent, the solution being introduced into at least one bed of gel grains swollen in this solvent and being of such structure that the substances, depending on their molecular size, distribute differently between the gel grains and the surrounding solution, the solvent being added to said at least one bed for eluting purposes, whilst recovering at least one fraction containing at least one of these substances of relatively large molecular size and at least one fraction containing at least one substance of relatively small molecular size, the improvement which comprises subjecting at least one member selected from the group consisting of the recovered fractions and the solution of the substances to be separated prior to being introduced into said at least one bed, to evaporation and passing the thus vapourized solvent subsequent to condensation into the said at least one bed as an eluting agent.

2. A process as claimed in claim 1, wherein the evaporation process is conducted for such a length of time that the formed condensate completely covers the need of eluting agent.

3. A process as claimed in claim 1, wherein the process is conducted in a closed system.

References Cited

UNITED STATES PATENTS 3,002,823  10/1961  Flodin et al. _____ 210—31 X

SAMIH N. ZAHARNA, Primary Examiner

U.S. Cl. X.R.

23—311; 210—31, 32; 260—112